US008239239B1

(12) United States Patent
Malhotra et al.

(10) Patent No.: US 8,239,239 B1
(45) Date of Patent: Aug. 7, 2012

(54) METHODS AND SYSTEMS FOR DYNAMIC WORKFLOW ACCESS BASED ON USER ACTION

(75) Inventors: Vibha Malhotra, Indirapuram (IN); Akshaya Saxena, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1226 days.

(21) Appl. No.: 11/781,464

(22) Filed: Jul. 23, 2007

(51) Int. Cl.
*G06Q 10/00* (2006.01)
(52) U.S. Cl. ...................................... 705/7.27
(58) Field of Classification Search ................ 705/7.27
See application file for complete search history.

(56) References Cited

U.S. PATENT DOCUMENTS

| 6,938,240 | B2* | 8/2005 | Charisius et al. | 717/104 |
|---|---|---|---|---|
| 7,237,240 | B1 | 6/2007 | Chen et al. | |
| 7,322,013 | B1* | 1/2008 | Benson et al. | 715/837 |
| 7,711,984 | B2* | 5/2010 | Tenenti | 714/15 |
| 7,761,393 | B2* | 7/2010 | Macbeth et al. | 706/16 |
| 2002/0055849 | A1* | 5/2002 | Georgakopoulos et al. | 705/1 |
| 2006/0242302 | A1* | 10/2006 | Walker et al. | 709/227 |
| 2006/0282790 | A1 | 12/2006 | Matthews et al. | |
| 2007/0299631 | A1* | 12/2007 | Macbeth et al. | 702/187 |
| 2007/0300185 | A1* | 12/2007 | Macbeth et al. | 715/825 |
| 2008/0065668 | A1* | 3/2008 | Spence et al. | 707/101 |
| 2008/0126987 | A1* | 5/2008 | Meschian et al. | 715/825 |
| 2008/0147453 | A1* | 6/2008 | Kogan et al. | 705/7 |
| 2008/0228685 | A1* | 9/2008 | Shivaji-Rao et al. | 706/46 |
| 2009/0287528 | A1* | 11/2009 | Strickland et al. | 705/9 |

OTHER PUBLICATIONS

Jim Borck ("Relationship Builders," InfoWorld, (Apr. 2004); 26(15), 24-26. Retrieved Apr. 4, 2011, from ABI/INFORM Global. (Document ID: 635465021).*
H. Albert Napier, et al. "A Process for Anticipating and Executing Icon Selection in Graphical User Interfaces." International Journal of Human-Computer Interaction 19, No. 2 (Nov. 2005): 241-252. Academic Search Premier, EBSCOhost (accessed Apr. 6, 2011).*
Bradley, Nicholas A., and Mark D. Dunlop. "Toward a Multidisciplinary Model of Context to Support Context-Aware Computing." Human-Computer Interaction 20, No. 4 (Dec. 2005): 403-446. Academic Search Premier, EBSCOhost (accessed Apr. 6, 2011).*

(Continued)

*Primary Examiner* — Romain Jeanty
*Assistant Examiner* — George H Walker
(74) *Attorney, Agent, or Firm* — Kilpatrick Townsend & Stockton LLP

(57) ABSTRACT

Certain embodiments of the present invention provide methods and systems for modifying a user interface to provide easier access to succeeding user actions in a stored workflow after receiving a subsequent user action that corresponds to a user action in a stored workflow. In one embodiment, workflows that include a series of such user actions are received and stored. User actions may be inputs from a user that select an option representing a function that is performed by the application. A subsequent user action is received that corresponds to a user action in one or more stored workflows. Each of the workflows that include a corresponding user action are identified. A favorite workflow is determined based on the number of identified workflows that include the same user actions, including a user action corresponding to the subsequent user action. After determining the favorite workflow, the application user interface can be modified to provide easier access to succeeding user actions in the favorite workflow.

26 Claims, 13 Drawing Sheets

OTHER PUBLICATIONS

Kjeldsen, Rick, Anthony Levas, and Claudio Pinhanez. "Dynamically reconfigurable vision-based user interfaces." Machine Vision & Applications 16, No. 1 (Dec. 2004): 6-12. Academic Search Premier, EBSCOhost (accessed Apr. 6, 2011).*

Antona, Margherita, Anthony Savidis, and Constantine Stephanidis. "A Process-Oriented Interactive Design Environment for Automatic User-Interface Adaptation." International Journal of Human-Computer Interaction 20, No. 2 (Mar. 2006): 79-116. Academic Search Premier, EBSCOhost (accessed Apr. 6, 2011).*

* cited by examiner

METHODS AND SYSTEMS FOR DYNAMIC WORKFLOW ACCESS BASED ON USER ACTION

FIELD OF THE INVENTION

The present invention relates generally to workflow access and more specifically to methods and systems for using workflow histories of a user to provide dynamic workflow access in an application.

BACKGROUND

A typical computer system includes a memory containing one or more applications that can be executed to perform various functions. The applications can provide a user interface, such as a graphical user interface (GUI), on a monitor and receive inputs such as mouse clicks and keyboard entries. The applications can receive a number of these inputs, such as selections of functions for the application to perform. For example, a user may select a function by using an input device, such as a mouse, to select a menu header on a toolbar to pull-down a menu listing various options, each representing a function. The user can select one of these options and cause the application to perform the function associated with the option.

Some applications allow the user to display a context menu that lists selectable options representing functions associated with the user's current status in the application. For example, a user can use a mouse to "right-click" and display a context menu, which is a temporary menu that allows users to select an option listed in the context menu. The options listed in the context menu can depend on where the user right-clicked on the GUI. If the user right-clicked on one type of data entered by the user, the context menu may list different options than if the user right-clicked on a second type of data entered by the user.

Applications may allow users to select a quick-button using an input device to cause the application to perform a function associated with the quick-button. Quick-buttons may be selectable buttons on a header or other area on a GUI that include icons representing the function associated with the quick-button. Typically, quick-buttons represent functions that are commonly selected by a user, such as for example, a "save," "open," or "print" button for document creation and manipulation applications.

Applications may also allow users to select functions using a keyboard. For example, users may select a function key, typically labeled F1, F2, etc., that corresponds to an application function. When the user inputs a function key the application performs the function corresponding to that function key. Correspondence between the function key and functions may be pre-set by the application or by a user.

Each function selected by a user and performed by the application may be a user action. The user can perform a workflow in an application that includes a series of user actions. Users often repeatedly perform similar, if not exact, workflows using an application. Since menus are often static on GUIs, the user may be required to repeatedly select a series of options using one or more selection methods. For example, the user may be required to select an option representing a function from a pull-down menu each time they wish to perform that function. In some applications, users may be required to select a pull-down menu and select a secondary menu within that pull-down menu to find the option representing the desired function. Repeating such steps increases the amount of time the user must spend performing the workflow and requires familiarity the user must possess with the location of the menu containing the option representing the desired function in a workflow.

Some applications have attempted to alleviate the time and familiarity with the application required to perform repeated functions. For example, some Microsoft® Windows operating systems provide a "Start Menu" in which one or more of the user's last used applications are listed in a convenient location for the user to access. Instead of finding the application again by looking through one or more secondary menus, the user can select the application as listed on the Start Menu. Such attempts, however, depend on the user's most recent selections and only provide the user with one option representing a function (i.e. opening an application) selectable in a convenient menu.

SUMMARY

Certain embodiments of the present invention provide methods and systems for modifying a user interface to provide easier access to succeeding user actions in a stored workflow. One embodiment is a method for providing dynamic workflow access in an application using favorite workflows. Workflows that include a series of user actions are received and stored. A subsequent user action is received that corresponds to a user action in one or more matched workflows. Each of the matched workflows that include a corresponding user action are identified. A favorite workflow is determined based on the matched workflows that include the same user actions. After determining the favorite workflow, the application user interface can be modified to provide easier access to succeeding user actions in the favorite workflow.

One embodiment of the present invention is a method for providing dynamic workflow access in an application based on a stored workflow. A series of user actions is received that comprises a first user action and a second user action. Each of the user actions is associated with a function performed by the application. The received series of user actions is stored as a workflow. A subsequent user action is received that corresponds to the first user action. The application user interface can be modified to provide easier access to a selectable option representing a function corresponding to a second user action. In some embodiments of the present invention, the workflow may include a first user action and a last user action. The workflow can also include one or more intermediate user actions after the first user action but before the last user action.

One embodiment of the present invention is a system for providing dynamic workflow access in an application. The system includes a display device that can display a user interface and a processor-based device comprising an application that includes a dynamic workflow engine. The application can provide the user interface and receive workflows comprising a series of user actions from an input device to select options on the user interface. Each series of user actions includes a first user action and a succeeding user action. The options can represent functions performed by the application. The dynamic workflow engine includes an action file in which workflows are stored and an output engine that can modify the user interface to provide access to a succeeding user action in a favorite workflow. The dynamic workflow engine can receive a subsequent user action and determine the favorite workflow based on the stored workflows having a user action corresponding to the subsequent user action.

In some embodiments of the present invention, the user interface can be modified by one or more methods. Examples of such methods include: (a) providing a selectable quick button option representing a second or succeeding user action function in a favorite workflow; (b) modifying a context menu to include an option representing the second or succeeding user action function in the favorite workflow; and (c) modifying a pull-down menu to include an option representing the or succeeding user action function in the favorite workflow.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein:

FIG. 8 is a screen shot of selecting a function to secure the document opened in

FIG. 7;

DETAILED DESCRIPTION

Embodiments of the present invention provide methods and systems for providing dynamic workflow access based on user history in an application. In one illustrative embodiment, a user performs user actions by accessing options on an application user interface that represent functions performed by the application. A series of user actions are identified as a workflow that is stored in an action file. For example, a workflow may include user actions such as opening a document, approving the document, and closing the document. The user can perform one or more such workflows in an application. Upon receiving a subsequent user action that corresponds to a user action in one or more stored workflows, a favorite workflow is identified from the stored workflows. The favorite workflow can include the same series of user actions as those workflows occurring most frequently in the stored workflows. The user interface is then modified to provide the user with easier access to succeeding user actions in the favorite workflow. For example, the user interface can be modified to provide easier access to a selectable option that represents the same function as a succeeding user action.

Illustrative System Implementation

Figure 1:
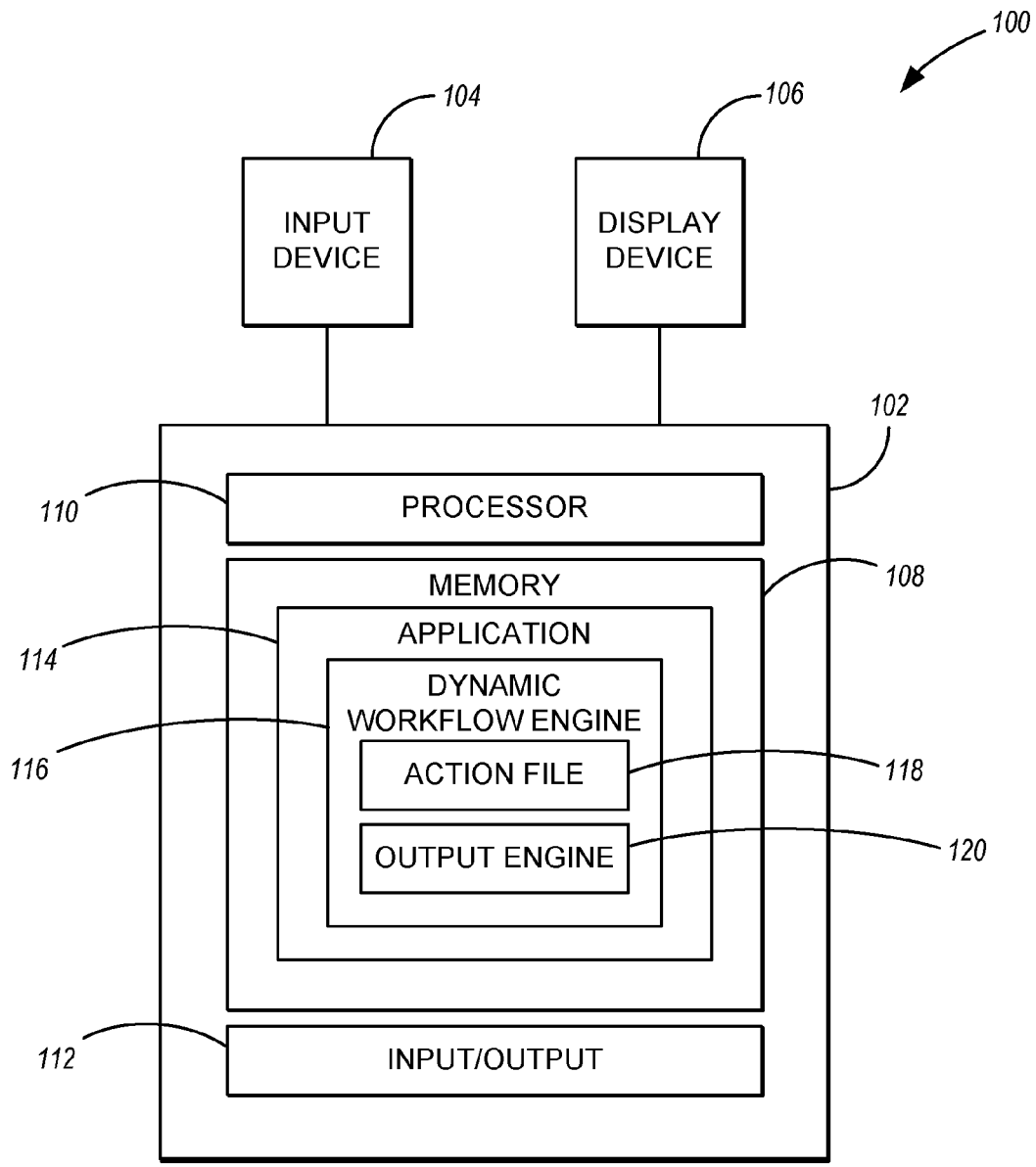
FIG. 1 is a system diagram illustrating an dynamic workflow access system according to one embodiment of the present invention.

Methods for providing dynamic workflow access can be implemented on any device capable of supporting interaction with a user, such as receiving inputs from the user, performing functions, and outputting a user interface. FIG. 1 illustrates one embodiment of a system 100 used to implement methods for providing dynamic workflow access. The system 100 can include a processor-based device 102 in communication with an input device 104 and a display device 106. The input device 104 can include one or more devices that allow users to input commands into the processor-based device 102, such as commands to select options representing functions associated with user actions. Examples of such input devices include a keyboard and a mouse. The display device 106 can receive an output, such as an application user interface, from the processor-based device 102 and display the output to a user. An example of a display device 106 is a monitor that can display a user interface, such as a graphical user interface (GUI). In some embodiments, the input device 104 and/or display device are directly connected to the processor-based device 102. In other embodiments, the input device 104 and/or or display device are connected to the processor-based device 102 over a network.

The processor-based device 102 can include a computer-readable medium, such as memory 108, that stores executable code and a processor 110 for executing the executable code. The processor-based device 102 may also include an input/output 112 that supports communication between the processor-based device 102 and the input device 104 and display device 106.

Memory 108 can include one or more applications, such as application 114, that can be executed upon the selection of application by a user via input device 104. The application 114 may be any type of application that outputs a user interface to the display device 106 and allows users to open files, perform functions on the files, and close the files. The application 114 may include a dynamic workflow engine 116 that can determine a user's favorite workflow and provide the user with easier access on the user interface to succeeding user actions in the favorite workflow. The dynamic workflow engine 116 can receive and store workflows in action file 118, determine a favorite workflow after receiving a subsequent user action, and use an output engine 120 to output a modification to the user interface based on the favorite workflow. The modification provides easier access to succeeding user actions in the favorite workflow based on the workflow history stored in the action file 118. In some embodiments, the dynamic workflow engine 116 may be a separate application that is executable concurrently with application 114. In some embodiments, the action file 118 and/or the output engine 120 are stored separately from the dynamic workflow engine 116.

Determining a Favorite Workflow

Workflows in some embodiments of the present invention can include a series of user actions defined by a first user action, optional intermediate user actions, and a last user action. A user action can include any input from a user that selects an option on the user interface to perform a function associated with the option. An example of one user action includes a user selecting a menu option from a pull-down menu on an application user interface. The workflows are stored and used to determine a user's favorite workflow. A user's favorite workflow can be determined based on the frequency of workflows that include the same user actions.

Figure 2:
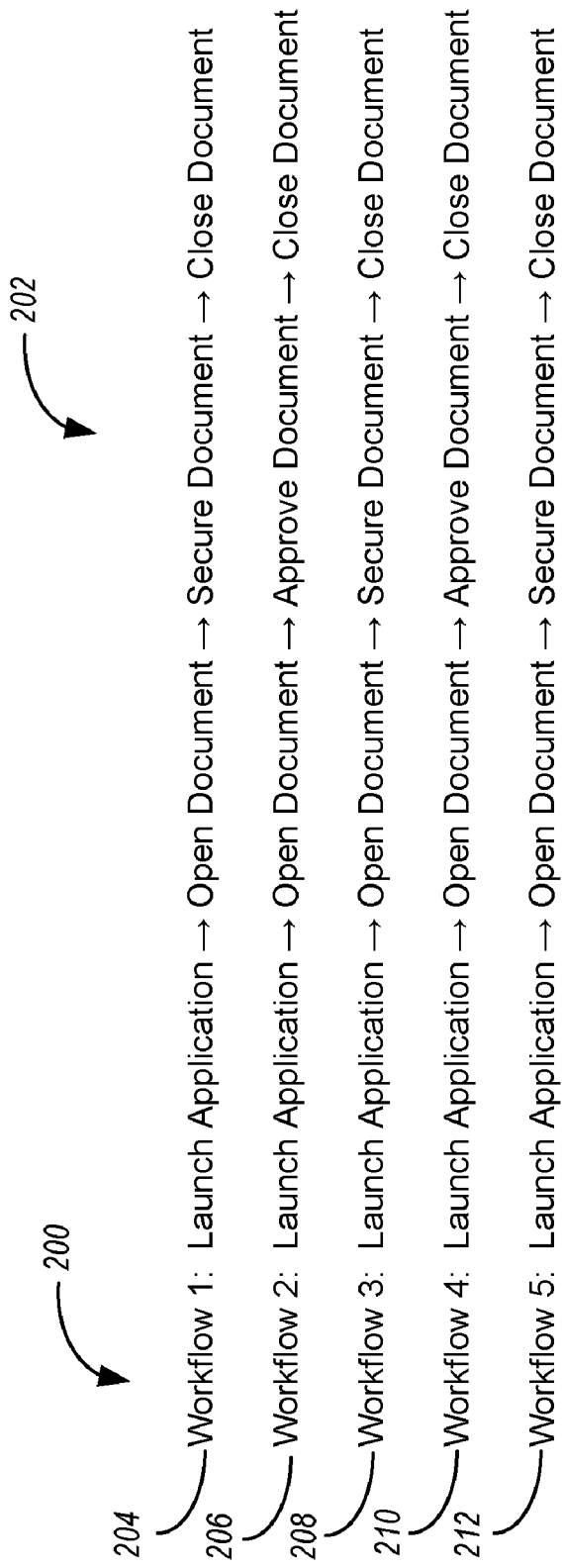
FIG. 2 is an exemplary list of workflows according to one embodiment of the present invention.

FIG. 2 illustrates a representation of stored user workflows 200 that include a series of user actions 202. The first workflow 204 was executed first and includes user actions such as launch application, open document, secure document, and close document. The user actions were performed successively by a user selecting options on the application user interface to form workflow 204. The second workflow 206 includes slightly different user actions. The user actions in the second workflow 206 include launch application, open document, approve document, and close document. The third workflow 208 and fifth workflow 212 each contain user actions that are the same as those in the first workflow 204. The user actions in the fourth workflow 210 include the same user actions as the second workflow 206.

An example of the first workflow 204 is illustrated using screen shots in FIGS. 5-10. The illustrative application in FIGS. 5-10 is Adobe® Acrobat Professional, which allows users to open portable document files (PDF), perform functions such as modifications or input information to the PDF, and close the PDF. The application can be stored in memory of a processor-based device, such as a computer, and can be launched upon the input from a user.

Figure 5:
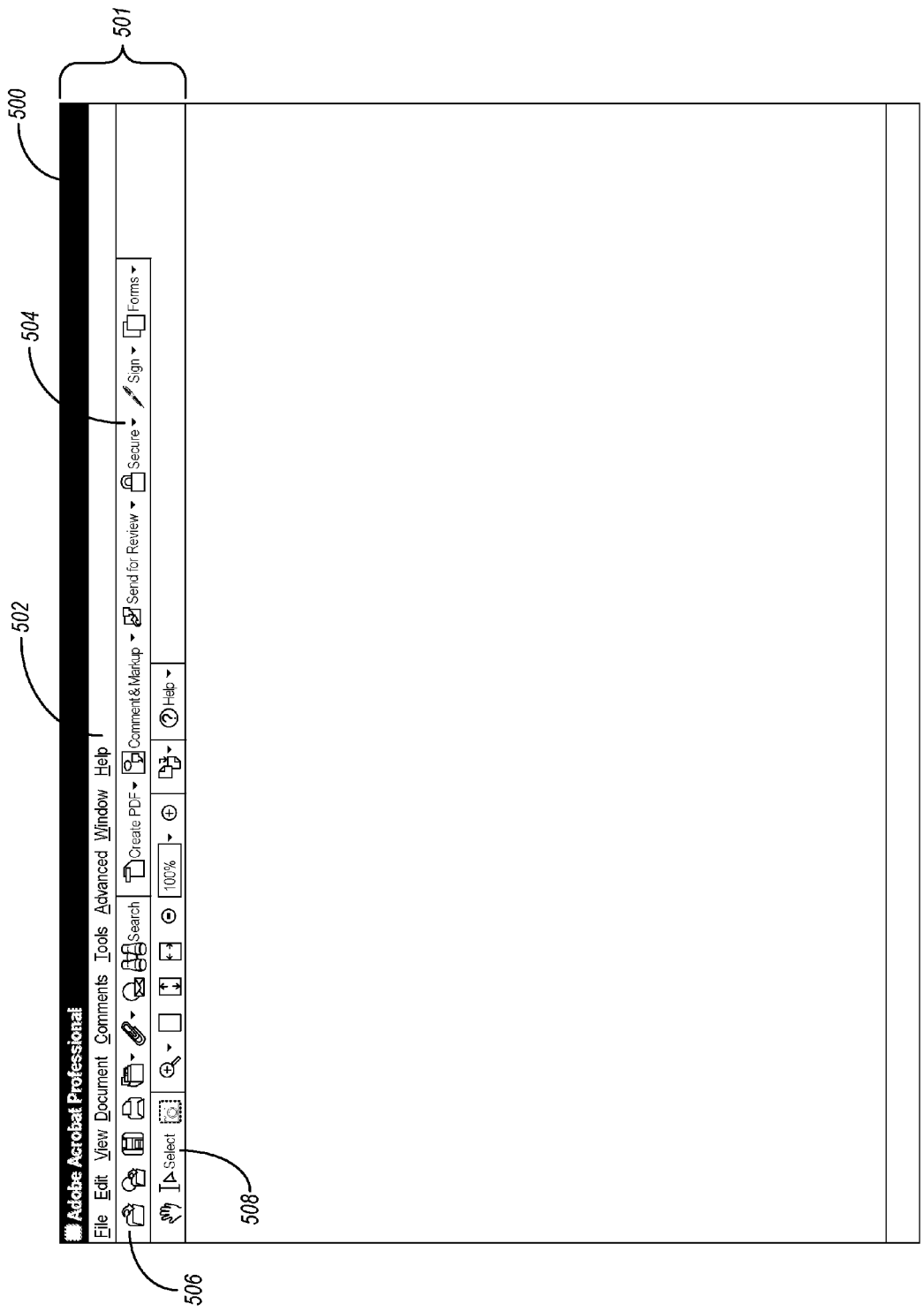
FIG. 5 is a screen shot of an opened application in a user interface according to one embodiment of the present invention.

In FIG. 5, a screen shot of the launched application user interface 500 without any open documents is shown. The user performed the first user action, launch application in the first workflow 204, by launching the application using an input device to select an option representing the application on a menu or a quick-button. The application user interface 500 includes a header 501 having pull-down menu options 502 that include titles such as file, edit, view, document, comments, tools, advanced, window, and help. The pull-down menu options, when selected, can provide the user with additional options associated with the title of each pull-down menu. The header can include additional pull-down menus 504 with the titles such as create PDF, comment & markup, send for review, secure, sign, and forms. Quick-buttons 506 are also provided on the header 502 that represent functions and can be selected by the user to perform those functions. Additional pull-down menus and quick-buttons 508 are also provided on the header 502

Figure 6:
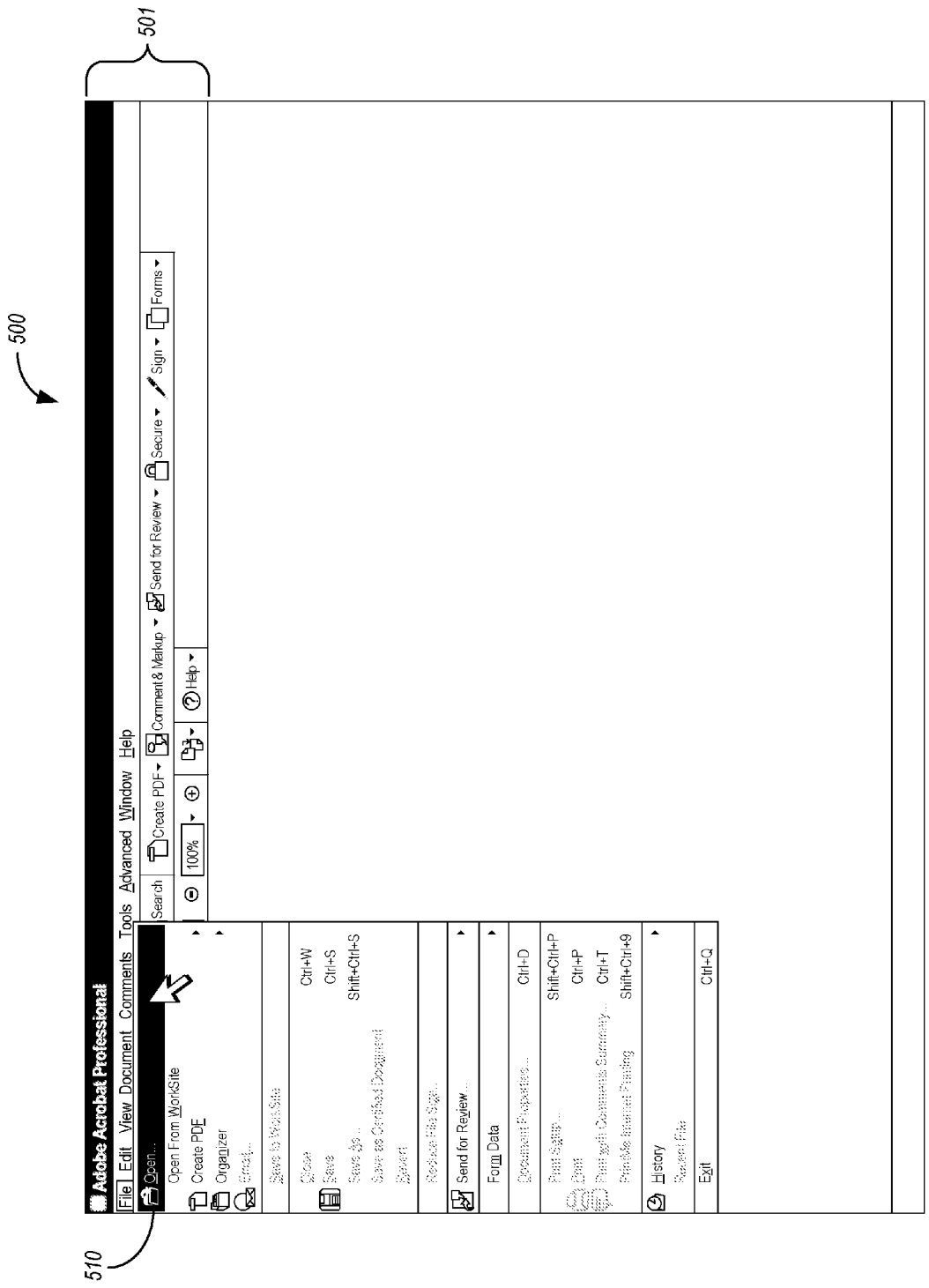
FIG. 6 is a screen shot of selecting a function to open a file using the application of FIG. 5.
Figure 7:
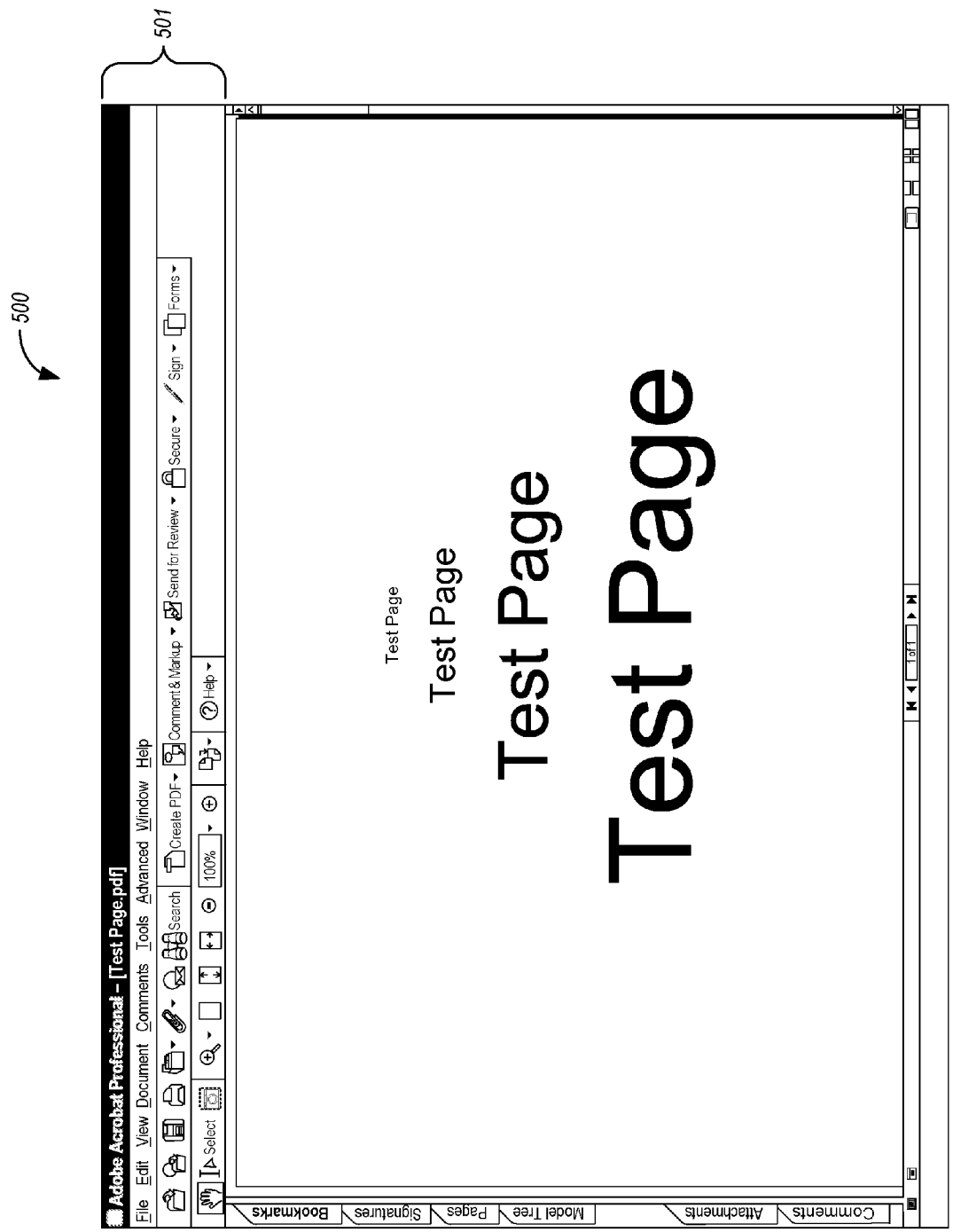
FIG. 7 is a screen shot of a file that is a document opened in the application of FIG. 5.

FIG. 6 shows a user performing the second user action in the first workflow 204 by opening a file. The user opens the file by using an input device, such as a mouse, to select the file pull-down menu option on the header 501 and select the open file option 510 that causes the application to open a file. FIG. 7 shows the file labeled "Test Page.pdf" opened and displayed to the user on the application user interface 500.

Figure 8:
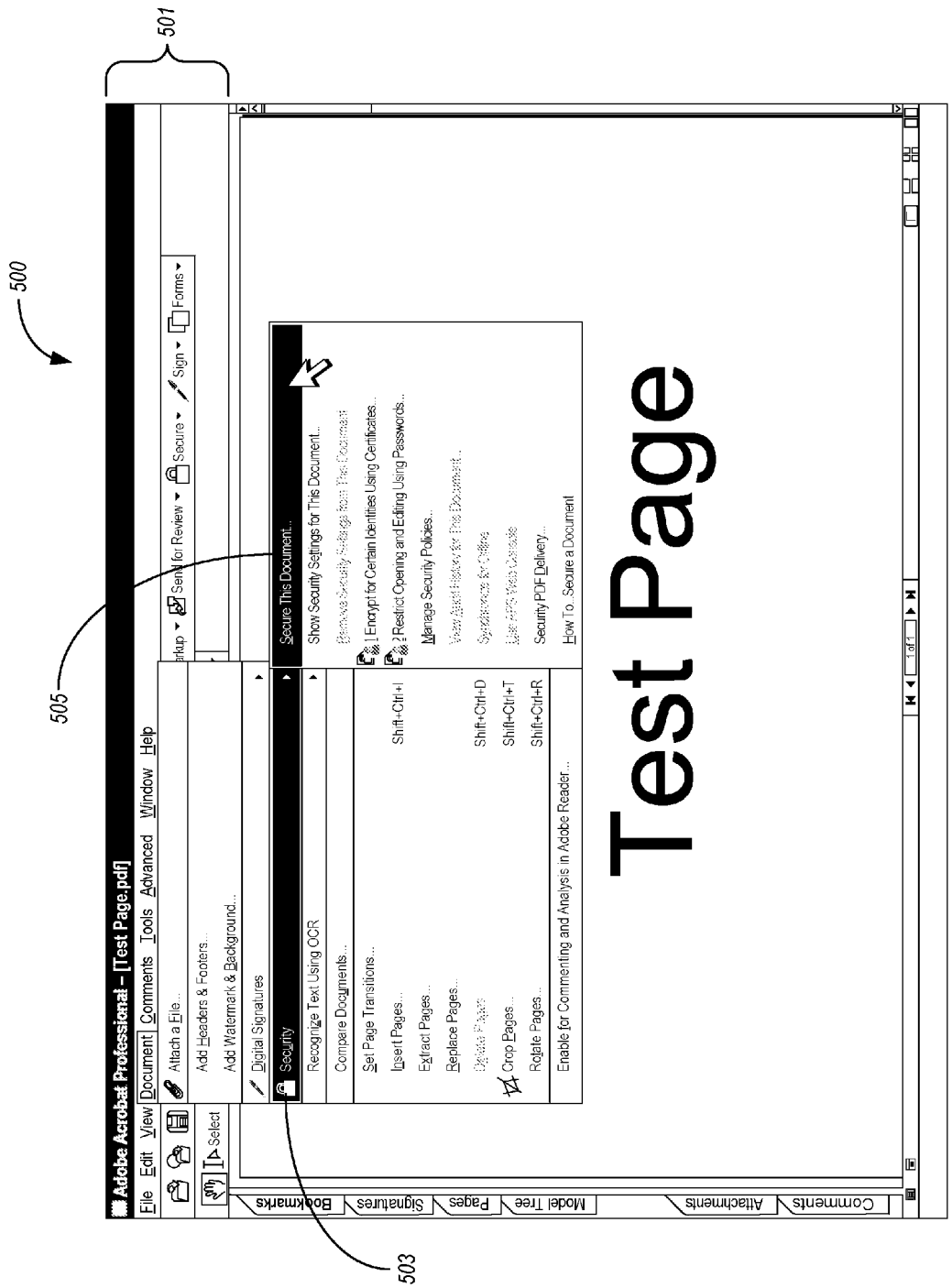

FIG. 8 shows a user performing the third user action, Secure Document, in the first workflow 204. The third user action can be performed by opening the document pull-down menu option, selecting the security menu option 503 included in the document pull-down menu, and selecting the option 505 labeled "Secure This Document." The option represents a function that can be performed by the application to secure the file labeled "Test Page.pdf."

Figure 9:
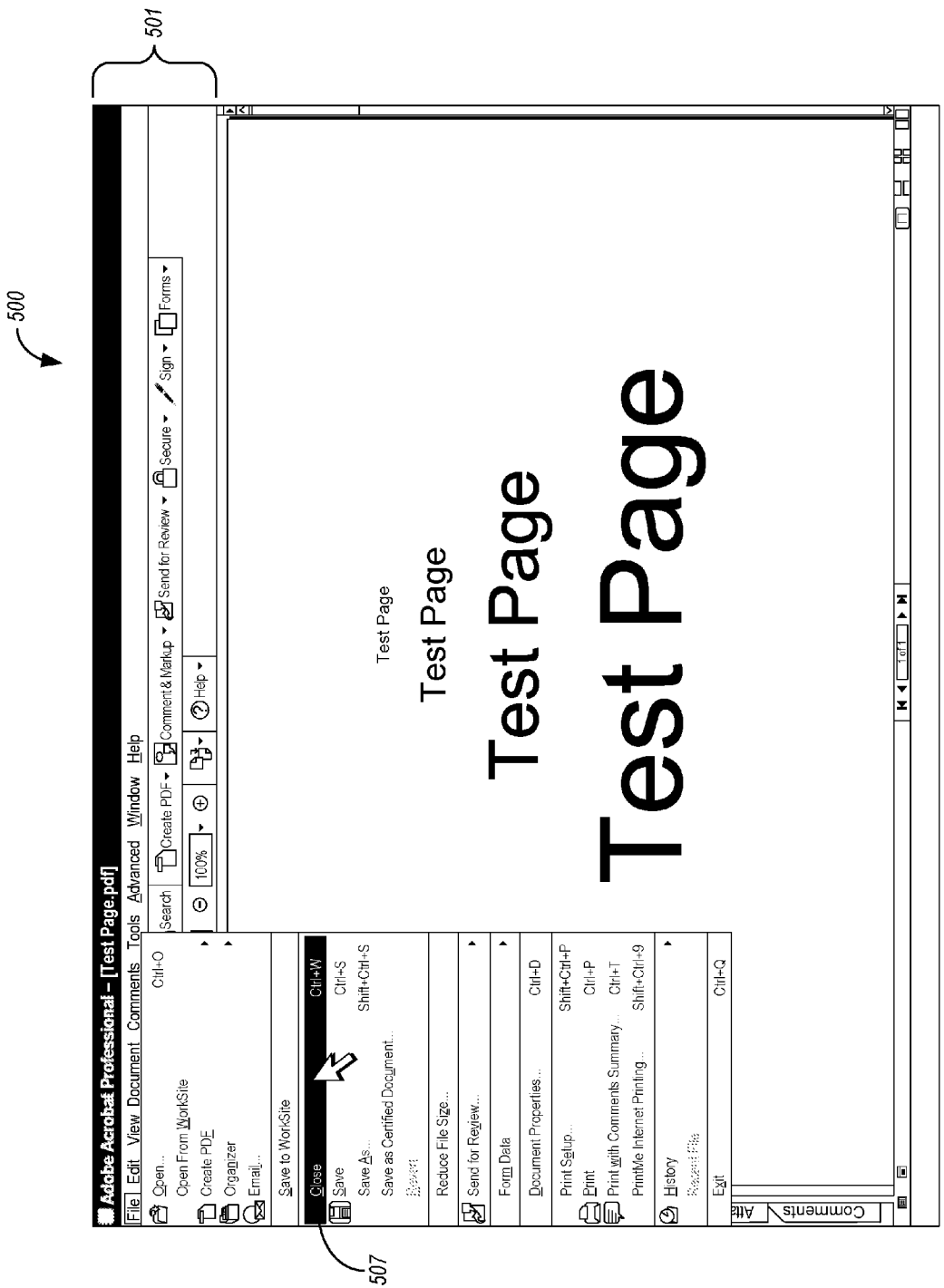
FIG. 9 is a screen shot of selecting a function to close the file opened in FIG. 7.
Figure 10:
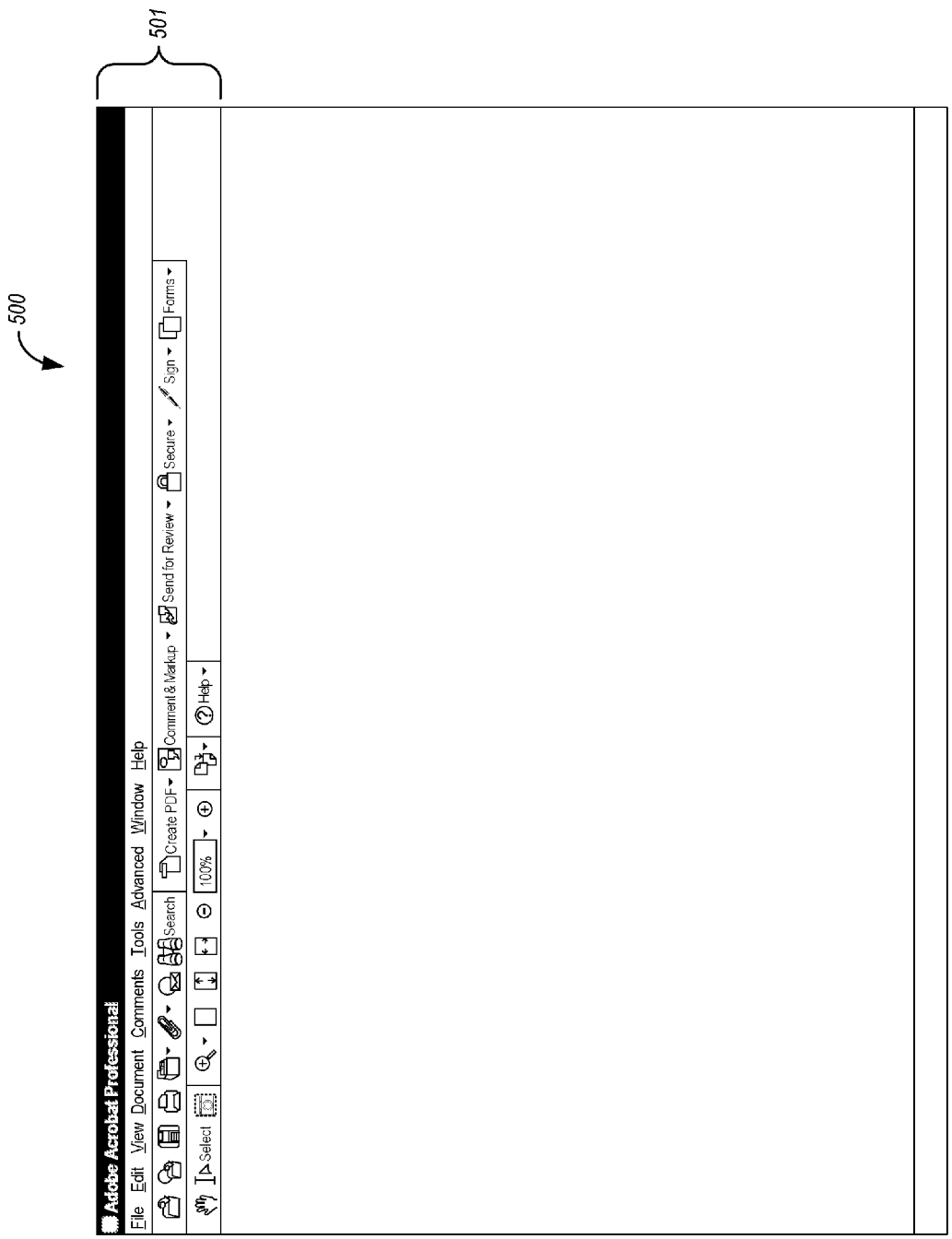
FIG. 10 is a screen shot of the application after the file is closed in FIG. 9.

FIG. 9 shows a user performing the fourth and last user action in the first workflow 204 on the application user interface. The fourth user action includes closing the file and can be selected by opening the file pull-down menu and selecting the option 507 labeled "Close." The function associated with the option labeled "Close" causes the application to close the file labeled "Test Page.pdf" and results in an application user interface, as shown in FIG. 10, without an opened document. The first, second, third, and fourth user actions can be saved as the first workflow 204 in an action file. The workflow includes the first user action and succeeding user actions, such as the second, third, and fourth user actions. Other workflows 200 can be performed using similar methods to those used to perform the first workflow 204.

A user's favorite workflow after the fifth workflow 212 can be determined upon the receipt of a subsequent user action. Workflows that include a matching user action to the subsequent user action are identified. If the subsequent user action is Launch Application or Open Document, all of workflows 200 are identified as matching workflows. The favorite workflow can be determined by comparing the number of times workflows that include the same user actions have been performed. In the example shown in FIG. 2, workflows 204, 208, 212 each contain the same user actions of launch application, open document, secure document, and close document. Workflows 206, 210 contain different user actions than those in workflows 204, 208, 212. Since the workflows 204, 208, 212 contain user actions that have been performed more often than workflows 206, 210, the favorite workflow is determined to include the same user actions as those in workflows 204, 208, 210.

A user's favorite workflow can change over time, depending on the user actions in the stored workflows. Certain embodiments of the present invention continuously determine a user's favorite workflow to capture any changes reflected in the stored workflows. For example, after a user performs a sixth and seventh workflow, along with those illustrated in FIG. 2, and each of the sixth and seventh workflows include user actions that are the same as those in workflows 206, 210, the user's favorite workflow, after the seventh workflow, would include the same user actions as those included in the second workflow 206, instead of the first workflow 204.

A favorite workflow may be determined even if two or more different stored workflows indicate that the user has equally performed workflows containing different user actions. For example, if a favorite workflow is determined after the second workflow 206 in FIG. 2, the two workflows 204, 206 containing different sequences of user actions are each candidates for the favorite workflow. In some embodiments of the present invention, the last performed user workflow, for example workflow 206, is the favorite workflow. In other embodiments, both workflows 204, 206 are the favorite workflow and the user interface can be modified to provide easier access to different user actions in the workflows 204, 206.

Illustrative Methods for Providing Dynamic Workflow Access

Figure 3:
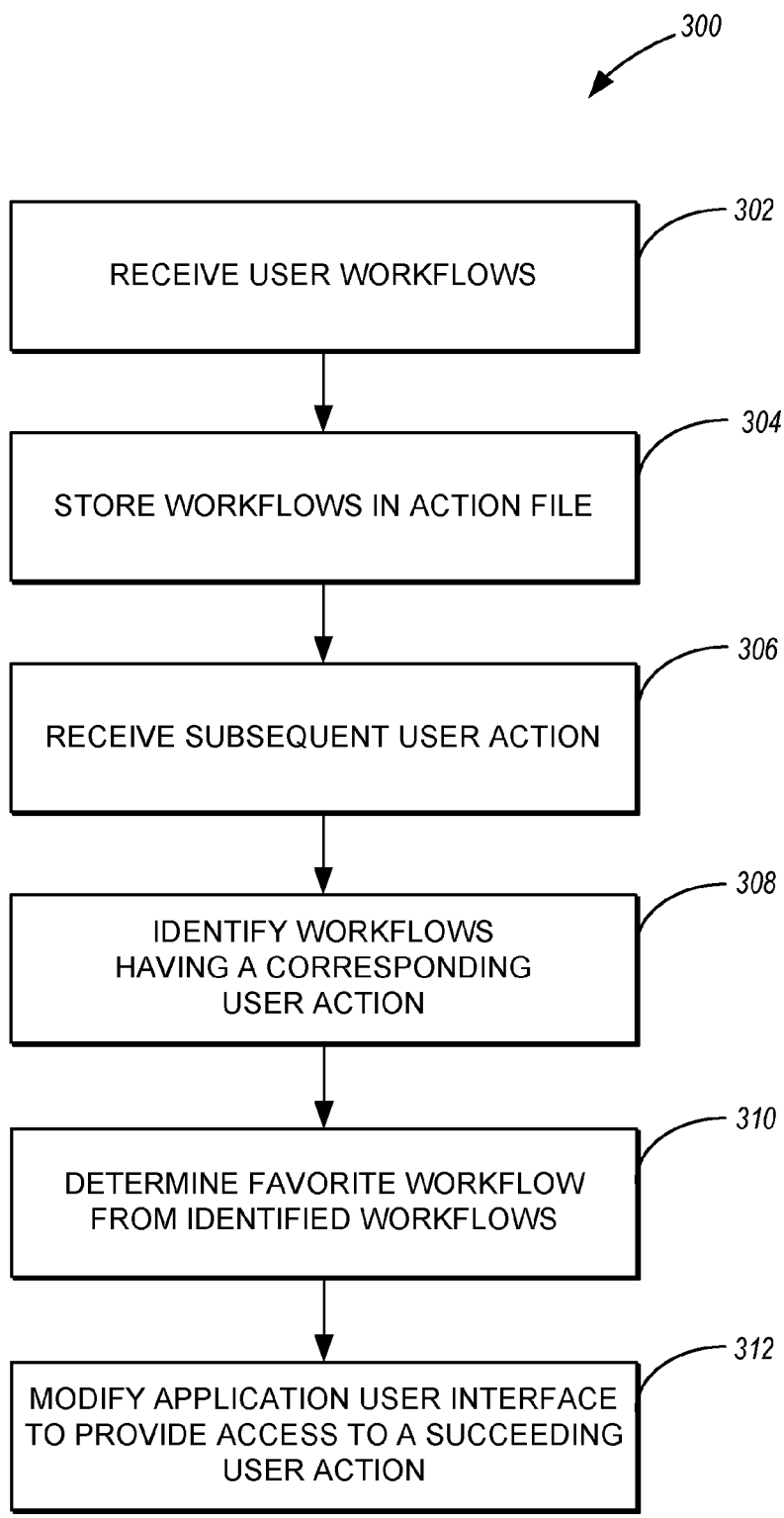
FIG. 3 is a flow chart illustrating one method for providing dynamic workflow access according to one embodiment of the present invention.

Various methods can be used to provide a user with dynamic access to one or more succeeding user actions in a favorite workflow. FIG. 3 illustrates one embodiment of a method 300 to receive workflows, determine a favorite workflow, and modify a user interface based on the favorite workflow. For purposes of illustration only, the elements of this method are described with reference to the system depicted in FIG. 1 and workflows depicted in FIG. 2. A variety of other implementations and workflows are also possible.

The dynamic workflow engine 116 receives workflows performed by a user in step 302. The workflows can include one or more user actions that are functions performed by application 114 after a user selects an option using input device 104 on an application user interface. The option can be displayed on display device 106 for the user to select and can represent a function. The user's selection of the option causes the application 114 to perform the represented function. A user may use input device 104 to select an option on a display device 106, such as an option from a pull-down menu, quick-button located on a header, and/or a context menu that represents a function performed by the application. The workflows can include a first user action and one or more succeeding user actions. For example, workflows 200 in FIG. 2 can be received by the processor-based device 102 that include user actions 202. User actions 202 can include a first user action, such as Launch Application, and succeeding user actions. Succeeding user actions can include a last user action, such as Close Document, and optional intermediate user actions, such as Open Document, Approve Document, and/or Secure Document. In some embodiments, the first user action includes launching the application and the last user action includes closing the application. In other embodiments, the first user action includes opening a file, such as a document, and the last user action includes closing the file.

In step 304, the received workflows 200 are stored in the action file 118 of a dynamic workflow engine 116 that is included in application 114. The action file 118 can store each of workflows 200 separately, and the user actions 202 associated with each of the workflows 200. Each user action can be associated with a hook tag. Hook tags can be bits of code that allow each user action to be identified based on the function associated with the user action and/or when, in the sequence of user actions, the user action was performed. Hook tags may be used to group or otherwise order the user actions in the workflow to facilitate determining workflows that have the same user actions and, optionally, the same user actions in the same order.

Figure 11:
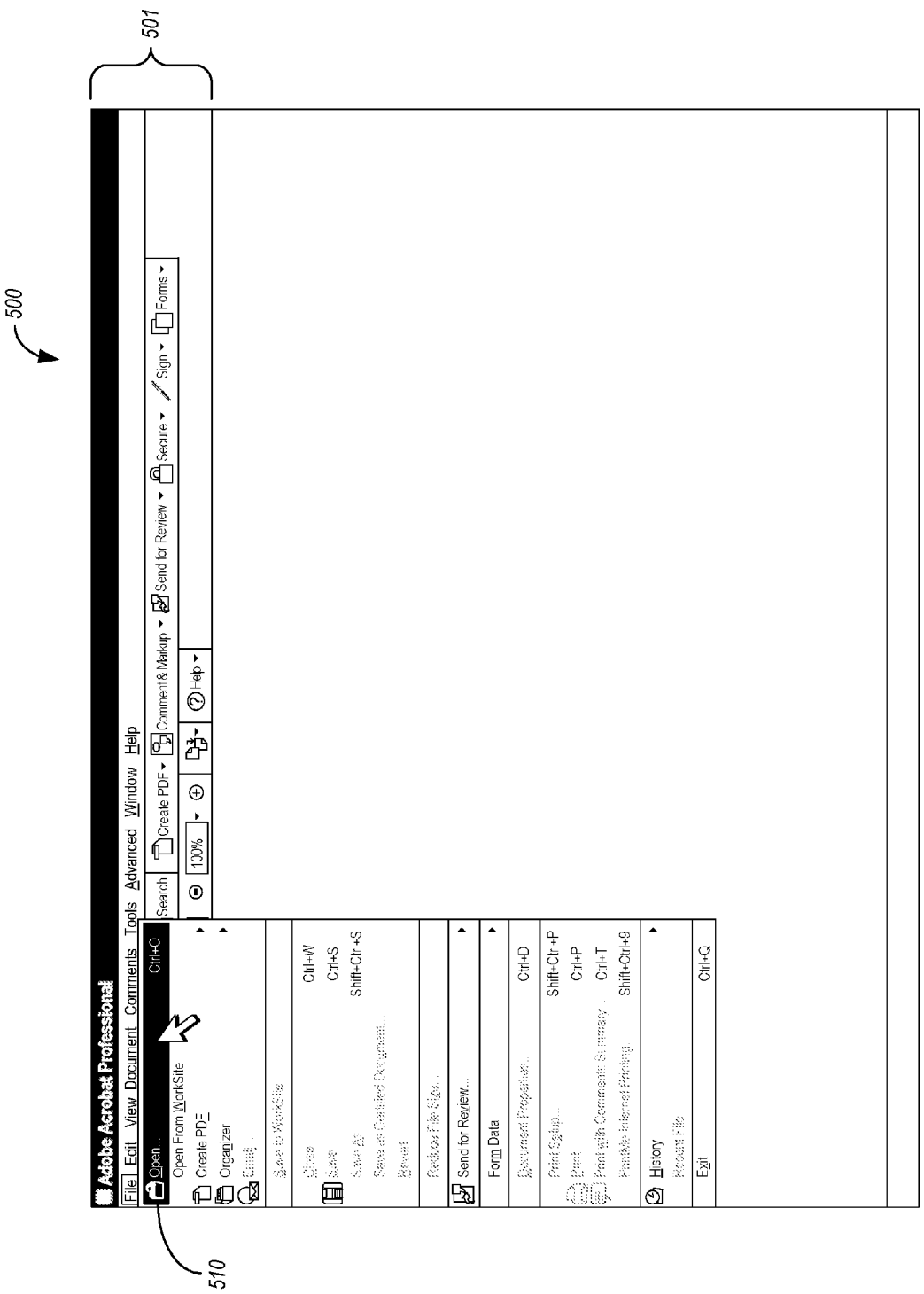
FIG. 11 is a screen shot of selecting a function to open a second file using the application of FIG. 5.

In step 306, a user action that is subsequent to the stored workflows 200 is received by the dynamic workflow engine 116. FIG. 11 shows an example of a subsequent user action that is Open Document. The subsequent user action includes the user opening a file by selecting the file pull-down menu and the option 510 labeled "Open" in the file pull-down menu. The subsequent user action may be a first or succeeding action in a workflow that the user is performing and optionally includes a hook tag indicating the function associated with the subsequent user action and/or when, in a sequence of user actions, the subsequent user action was performed.

In step 308, the dynamic workflow engine 116 identifies stored workflows in the action file 118 that include a user action matching the subsequent user action. For example, each of workflows 200 include the user action of Open Document that matches the subsequent user action of Open Document. In some embodiments, the dynamic workflow engine 116 compares the subsequent user action hook tag to hook tags of user actions in the workflows stored in action file 118. The dynamic workflow engine 116 identifies those workflows that include a user action with a hook tag representing the same function as the subsequent user action hook tag. In some embodiments, workflows may be identified that include user actions in the same position in a sequence of user actions as the subsequent user action. In other embodiments, the dynamic workflow engine 116 compares the function associated with the subsequent user action to functions associated with user actions in each workflow without using hook tags to identify those workflows that contain a user action corresponding to the subsequent user action.

In step 310, the dynamic workflow engine 116 determines a favorite workflow based on the identified workflows 200 and the subsequent user action. The identified workflows 200 each contain a user action that matches the subsequent user action of Open Document, but otherwise may include different user actions from each other. For example, the first workflow 204 includes a Secure Document user action, while the second workflow 206 includes an Approve Document user action. The dynamic workflow engine 116 can determine that the favorite workflow includes the same user actions as those in workflows that occurred most frequently in the identified workflows 200. Using workflows 200, the dynamic workflow engine 116 determines that the favorite workflow includes the same user actions as the first workflow 204 since three out of the five workflows 200 include the same user actions as the first workflow 204. Thus, the favorite workflow includes the user actions of Launch Application, Open Document, Secure Document, and Close Document.

The favorite workflow can also be determined from two or more most frequent workflows. For example, if the dynamic workflow engine 116 determines the favorite workflow after the second workflow 206, both the first workflow 204 and the second workflow 206 include different user actions, but neither workflow has occurred more frequently than the other. In some embodiments, the favorite workflow contains the same user actions as those in the second workflow 206, the last performed workflow. In other embodiments, two or more favorite workflows are identified that contain user actions corresponding to the two or more workflows. The user interface can be modified with options representing user actions in the one or more favorite workflows. The favorite workflow may change over time. Accordingly, some embodiments of the present invention determine a favorite user action after each subsequent user action is received.

In step 312, the dynamic workflow engine 116 modifies the application user interface displayed on the display device 106 to provide access to one or more succeeding user actions in the favorite workflow. The dynamic workflow engine 116 can use an output engine 120 to modify the application user interface in one or more ways to provide the user with easier access to succeeding user actions. As determined in step 310, the favorite workflow includes the same user actions as the first workflow 204 after receiving a subsequent user action that includes the user action of Open Document. Instead of requiring the user to select one or more pull-down menus to access the succeeding user action of Secure Document, the option associated with the Secure Document function can be placed in a more convenient location on the user interface. Examples of ways the application user interface is modified include: (a) providing a selectable quick button option representing a second or succeeding user action function in a favorite workflow; (b) modifying a context menu to include an option representing the second or succeeding user action function in the favorite workflow; and (c) modifying a pull-down menu to include an option representing the or succeeding user action function in the favorite workflow.

Figure 12:
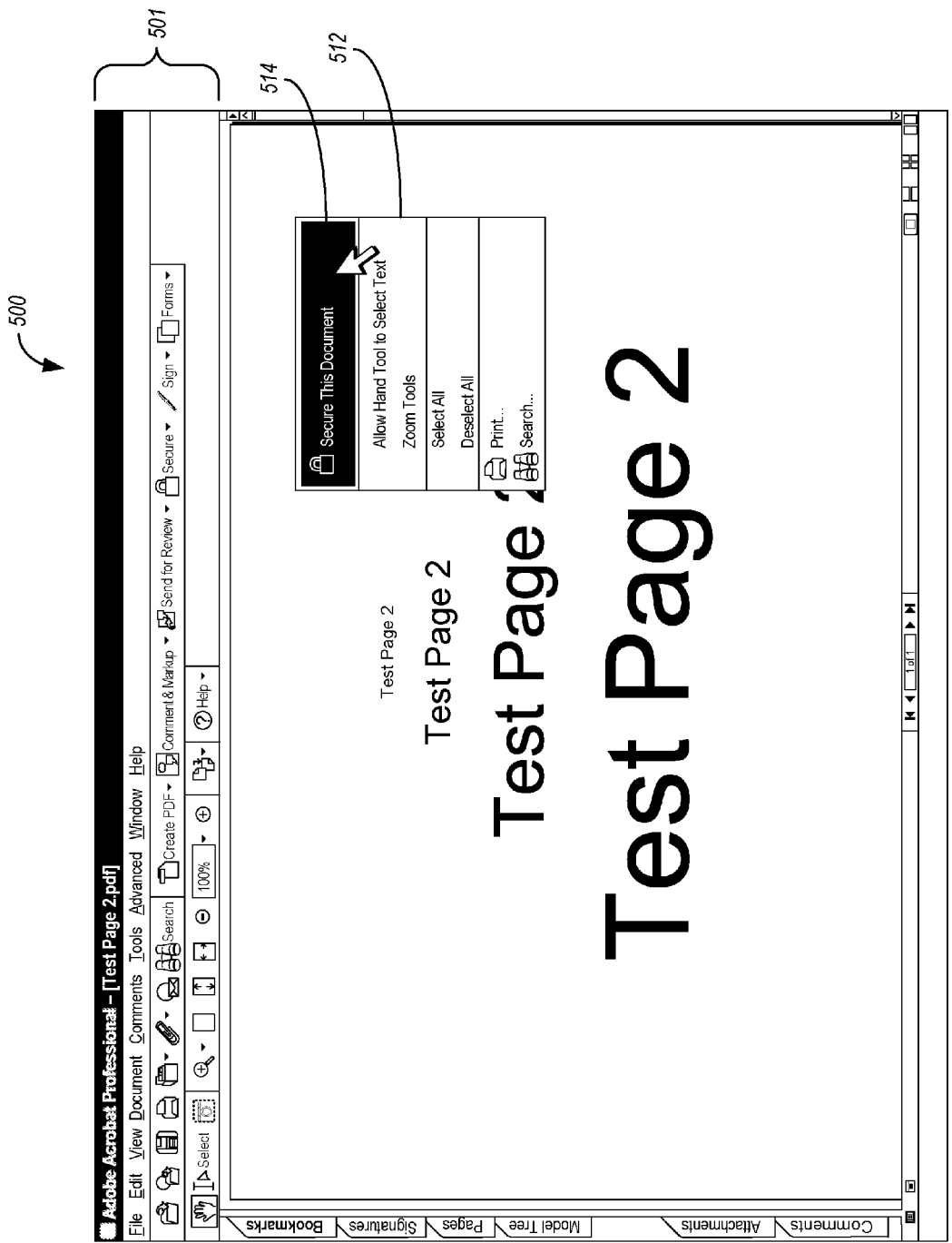
FIG. 12 is a screen shot of the opened second file and a context menu providing access to the function selected in FIG. 8.
Figure 13:
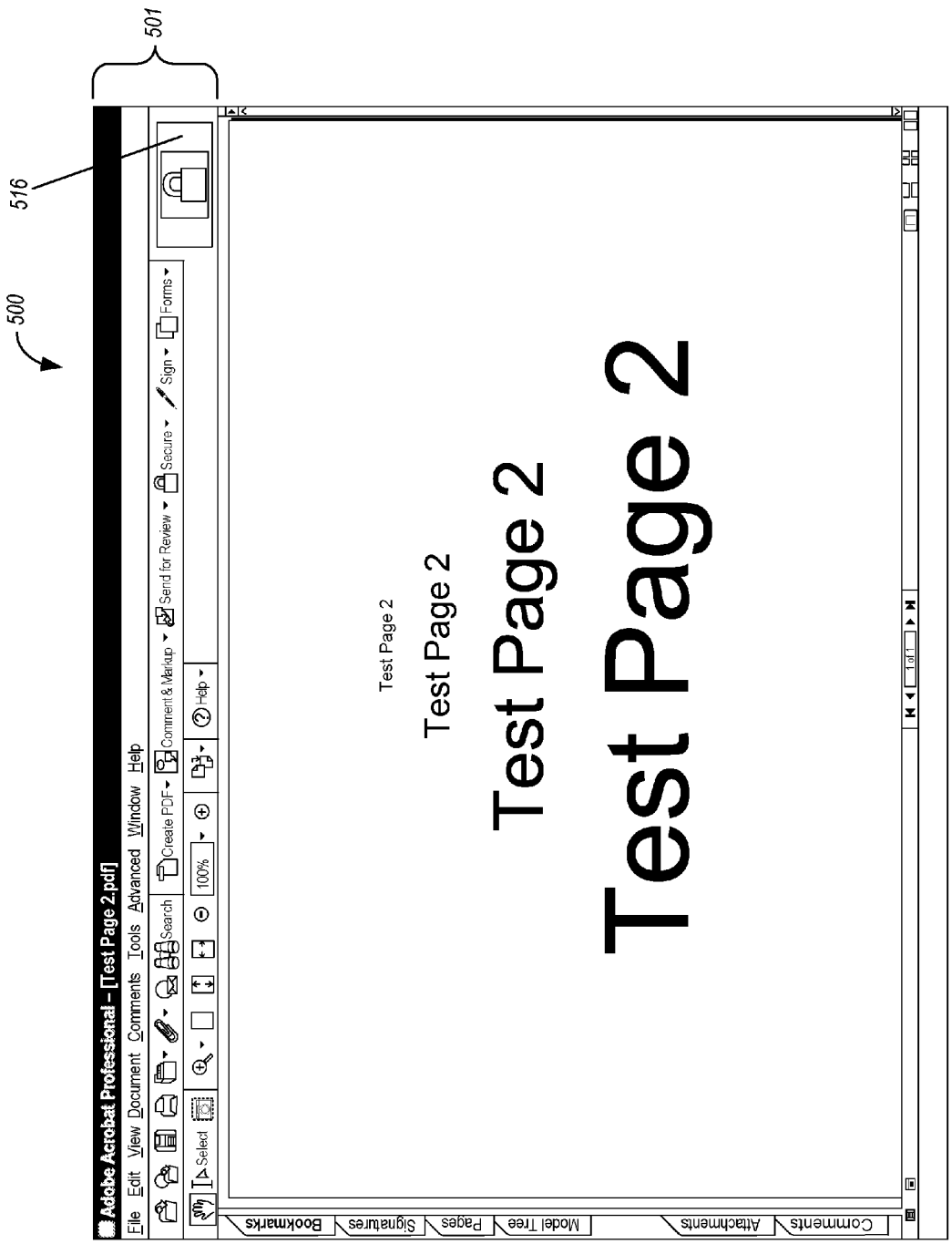
FIG. 13 is a screen shot of the opened second file and a modified header providing access to the function selected in FIG. 8.

FIGS. 12-13 illustrate two examples of ways a user interface can be modified to provide easier access to the succeeding user action of Secure Document. In FIG. 12, the user has opened a second document labeled "Test Page 2.pdf" by performing the subsequent user action. When the user causes a context menu 512 to appear, such as by inputting a "right-click" on a mouse or otherwise, the dynamic workflow engine 116 accesses the favorite workflow stored in the action file 118 and uses the output engine 120 to modify the context menu 512 to include an option 514 representing the Secure Document function. The user can select the option 514 to cause the application 114 to perform the Secure Document function.

In FIG. 13, the user has opened the second document labeled "Test Page 2.pdf" by performing the subsequent user action. When the file is opened, the dynamic workflow engine 116 access the favorite workflow in the action file 118 and modifies the user interface via output engine 120 to include a quick-button 516 in the header 501 that is an option representing the Secure Document function. The user can select the quick-button 516 to cause the application 114 to perform the Secure Document function.

The user can choose to perform one or more succeeding user actions in the favorite workflow by selecting an option provided on the modified user interface and/or perform other user actions not included in the favorite workflow. The dynamic workflow engine 116 can save this sequence of user actions in the action file 118 as a new workflow and use the new workflow to determine a new favorite workflow upon receiving a subsequent user action at a later time. The user may also perform the succeeding user actions in the favorite workflow by utilizing the options provided on the modified user interface or performing normal user actions without utilizing the options provided on the modified user interface. The dynamic workflow engine 116 can store the user's performance of the favorite workflow in the action file 118 by increasing the number of stored workflows corresponding to the favorite workflow, regardless of whether the user utilizes options provided on the modified user interface.

Figure 4:
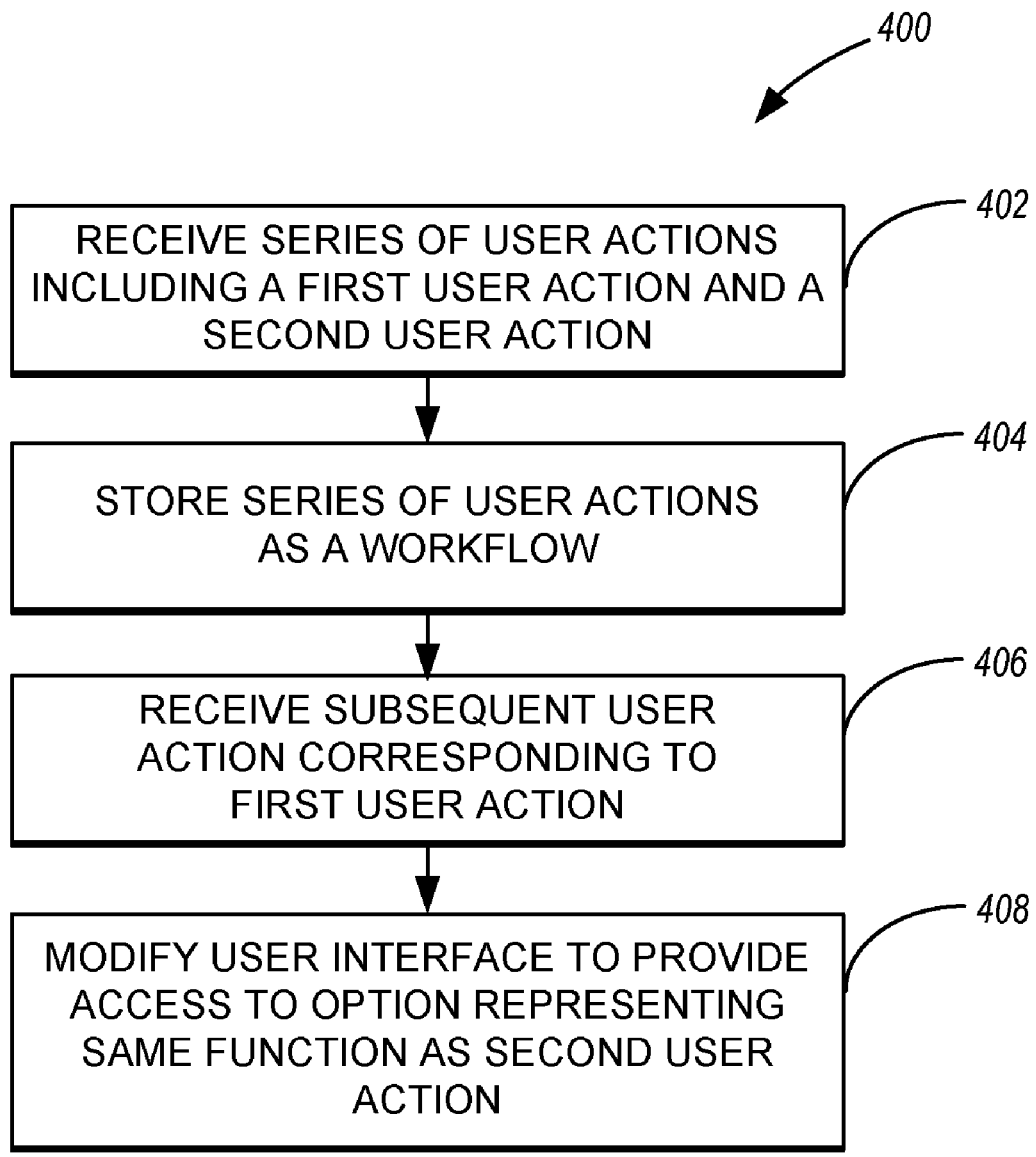
FIG. 4 is a flow chart illustrating a second method for providing dynamic workflow access according to one embodiment of the present invention.

FIG. 4 illustrates one embodiment of a method 400 to receive user actions and modify a user interface based on the received user actions. For purposes of illustration only, the elements of this method are described with reference to the system depicted in FIG. 1. A variety of other implementations are also possible.

The method 400 begins at step 402 when a series of user actions is received by processor-based device 102. The user actions may be performed by a user selecting options displayed on the display device 106 with input device 104. The series of user actions can include a first user action and a second user action. The inputs can cause the application 114 to access processor 110 to execute the functions associated with the selected options. In some embodiments, the series of user actions includes a first user action and a plurality of succeeding user actions. The succeeding user actions can include a last user action and optional intermediate user actions. The second user action may be an intermediate user action or the last user action. In some embodiments, the first user action is the launching of the application and the last user action is the closing of the application. In other embodiments, the first user action is the opening of a file using the application and the last user action is the closing of the file.

In step 404, the series of user actions are stored as a workflow in action file 118. The dynamic workflow engine 116 can receive the user actions and store them in action file 118. Each user action in the series of user actions can be associated with a hook tag, which includes information about the function associated with the user action and the location in the series of user actions that the user action associated with the hook tag occurred.

In step 406, the dynamic workflow engine 116 receives a subsequent user action to the workflow. The dynamic workflow engine 116 determines that the subsequent user action corresponds to the first user action in the workflow. For example, the subsequent user action may be associated with the same function as the first user action.

In step 408, the dynamic workflow engine 116 accesses the workflow stored in action file 118 and outputs a modification to the application user interface via output engine 120 based on the stored workflow. The modified user interface provides the user with easier access to succeeding user actions in the stored workflow. For example, the dynamic workflow engine 116 can use an output engine 120 to modify the user interface to provide the user easier access to an option representing the same function as one or more succeeding user actions in the stored workflow. The application user interface may be modified in one or more ways to provide the user with easier access to the selectable option representing the function associated with the second user action in the favorite workflow. Examples of ways the application user interface is modified include: (a) providing a selectable quick button option representing a second or succeeding user action function in a favorite workflow; (b) modifying a context menu to include an option representing the second or succeeding user action function in the favorite workflow; and (c) modifying a pull-down menu to include an option representing the or succeeding user action function in the favorite workflow.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

That which is claimed:

1. A method for providing dynamic workflow access in an application, the method comprising:
  receiving user workflows, each user workflow comprising a first user action and at least one succeeding user action;
  receiving a subsequent user action associated with a first hook tag representing a function for the subsequent user action, wherein the first hook tag comprises bits of code that identify the function for the subsequent user action and a location of the subsequent user action within a sequence of user actions;
  identifying, by a dynamic workflow engine executed by a processor, at least one matched workflow from the user workflows, the matched workflow being identified by comparing the first hook tag associated with the subsequent user action with a corresponding second hook tag associated with a user action of the matched workflow, wherein the second hook tag comprises bits of code that identify the function of the user action of the matched workflow and a location of the user action within a sequence of user actions, wherein the first hook tag corresponds to the second hook tag when the function for the subsequent user action is the same as a function for the user of the matched workflow;
  determining, by the dynamic workflow engine executed by the processor, a favorite workflow based on the matched workflow; and
  modifying, by the dynamic workflow engine executed by the processor, an application user interface to provide access to at least one succeeding user action in the favorite workflow.

2. The method of claim 1, wherein determining the favorite workflow based on the matched workflow comprises:
  identifying a plurality of matched workflows; and
  determining the favorite workflow based on the most frequent matched workflow.

3. The method of claim 1, wherein the subsequent user action corresponds to the first user action in one or more workflows.

4. The method of claim 1, wherein modifying the application user interface comprises:
  modifying a context menu to include an option representing at least one succeeding user action in the favorite workflow.

5. The method of claim 1, wherein the succeeding user action comprises a last user action.

6. The method of claim 5, wherein the first user action comprises opening the application and the last user action comprises closing the application.

7. The method of claim 5, wherein the first user action comprises opening a file using the application and the last user action comprises closing the file using the application.

8. A non-transitory computer-readable medium on which is program code for providing dynamic workflow access in an application, the non-transitory computer-readable medium comprising:

program code for receiving a workflow comprising a first user action and a second user action, the first user action being associated with a first hook tag representing a first function performed by the application, and the second user action being associated with a second hook tag representing a second function performed by the application, wherein the first hook tag comprises bits of code that identify the first user action based on the first function and a location of the first user action within a sequence of user actions, and wherein the second hook tag comprises bits of code that identify the second user action based on the second function and a location of the second user action within the sequence of user actions;

program code for receiving a subsequent user action associated with a subsequent hook tag corresponding to the first hook tag associated with the first user action, wherein the subsequent hook tag is configured to correspond to the first hook tag when a function for the subsequent user action is the same as the first function, and wherein the subsequent hook tag comprises bits of code that identify the subsequent user action based on the subsequent function and a location of the subsequent user action within the sequence of user actions; and program code for modifying, responsive to identifying that the second subsequent hook tag corresponds to the first hook tag, an application user interface to provide access to a selectable option representing a function corresponding to a second user action function in the workflow.

9. The non-transitory computer-readable medium of claim 8, wherein program code for modifying the application user interface comprises at least one of:

program code for providing a selectable quick button option representing the second user action function in a stored workflow;

program code for modifying a context menu to include an option representing the second user action function in the stored workflow; or program code for modifying a pull-down menu to include an option representing the second user action function in the stored workflow.

10. The non-transitory computer-readable medium of claim 8, wherein the workflow comprises the first user action and a last user action.

11. The non-transitory computer-readable medium of claim 10, wherein the first user action comprises opening the application and the last user action comprises closing the application.

12. The non-transitory computer-readable medium of claim 10, wherein the first user action comprises opening a file using the application and the last user action comprises closing the file using the application.

13. A system for providing dynamic workflow access in an application, the system comprising:

a display device adapted to display a user interface;

a processor-based device comprising an application having a dynamic workflow engine, the application being adapted to provide the user interface and receive workflows, each workflow comprising a first user action and at least one succeeding user action from an input device, the user interface comprising selectable options; and the dynamic workflow engine comprising an action file for storing workflows and an output engine to output a modified user interface that provides access to a succeeding user action in a favorite workflow, wherein the dynamic workflow engine is adapted to receive a subsequent user action, determine a first hook tag comprising bits of code representing a function for the subsequent user action and a location of the subsequent user action within a sequence of user actions, and determine the favorite workflow based on a stored workflow, wherein the dynamic workflow engine is configured to determine the favorite workflow by comparing the first hook tag associated with the subsequent user action with a corresponding a second hook tag comprising bits of code that are associated with a user action in the stored workflow and a location of the user action within a sequence of user actions of the stored workflow, wherein the second hook tag is configured to correspond to the first hook tag when a function for the user action in the stored workflow is the same as the function for the subsequent user action.

14. The system of claim 13, wherein the processor-based device further comprises an input/output interface to receive inputs from the input device and output the user interface to the display device.

15. The system of claim 13, wherein each user action is adapted to select an option to perform a function associated with the selected option.

16. The system of claim 13, wherein the dynamic workflow engine corresponds the subsequent user action to the stored workflows and determines the favorite workflow from a corresponding workflow.

17. The system of claim 16, wherein the dynamic workflow engine determines the favorite workflow from a workflow occurring most frequently in the corresponding workflows.

18. The system of claim 13, wherein the output engine modifies the user interface by at least one of:

providing a selectable quick button option representing a second user action function in the favorite workflow;

modifying a context menu to include an option representing the second user action function in the favorite workflow; or modifying a pull-down menu to include an option representing the second user action function in the favorite workflow.

19. The system of claim 13, wherein the stored workflow comprises the first user action and a last user action.

20. The system of claim 19, wherein the first user action comprises opening the application and the last user action comprises closing the application.

21. The system of claim 19, wherein the first user action comprises opening a file using the application and the last user action comprises closing the file using the application.

22. The system of claim 13, wherein the second hook tag comprises information regarding the location in the stored workflow that the user action associated with the second hook tag occurred.

23. The system of claim 13, wherein the dynamic workflow engine receives a sequence of user actions after determining the favorite workflow and stores the sequence of user actions in the action file as a new workflow, the dynamic workflow engine being adapted to determine a new favorite workflow based on the new workflow.

24. The system of claim 13, wherein the dynamic workflow engine receives a sequence of user actions corresponding to the favorite workflow and increases a number of workflows stored in the action file that correspond to the favorite workflow, the sequence of user actions being performed with or without utilizing the access to a succeeding user action provided by the modified user interface.

25. The method of claim 1, wherein modifying the application user interface comprises:

providing a selectable quick button representing at least one succeeding user action in the favorite workflow.

26. The method of claim 1, wherein modifying the application user interface comprises:

modifying a pull-down menu to include an option representing at least one succeeding user action in the favorite workflow.

\* \* \* \* \*